United States Patent [19]

Roalson

[11] 4,074,134
[45] Feb. 14, 1978

[54] OPERATING POINT REGULATION FOR A CORONA DISCHARGE DEVICE

[75] Inventor: Howard John Roalson, San Jose, Calif.

[73] Assignee: International Business Machines Corporation, Armonk, N.Y.

[21] Appl. No.: 676,586

[22] Filed: Apr. 13, 1976

[51] Int. Cl.² .......................................... H01T 19/04
[52] U.S. Cl. ................................... 250/324; 250/325
[58] Field of Search ....................... 250/324, 325, 326; 317/262 A

[56] References Cited

U.S. PATENT DOCUMENTS

| 3,496,351 | 2/1970 | Cunningham | 250/326 |
| 3,819,942 | 6/1974 | Hastwell | 250/324 |
| 3,934,141 | 1/1976 | Vargas | 250/324 |
| 3,950,680 | 4/1976 | Michaels et al. | 250/324 |
| 3,961,193 | 6/1976 | Hudson | 250/324 |
| 3,976,881 | 8/1976 | Parker | 250/324 |

*Primary Examiner*—Bruce C. Anderson
*Attorney, Agent, or Firm*—Otto Schmid, Jr.

[57] ABSTRACT

A control circuit for a corona discharge device in which the high voltage to the corona wire is electronically controlled in response to an error voltage generated by summing a reference and a sense current. In one embodiment the sense current is proportional to the screen voltage and in another embodiment the sense current is the current to the photoconductor. In each case the sense current is isolated in a single resistor. The high voltage is adjusted by utilizing the error voltage to adjust the control voltage to the high voltage power supply.

4 Claims, 6 Drawing Figures

OPERATING POINT REGULATION FOR A CORONA DISCHARGE DEVICE

BACKGROUND OF THE INVENTION

This invention relates to corona discharge devices and more particularly to improved regulation of the deposition of charge on an electrophotographic imaging member.

There have been many attempts to stabilize and regulate the deposition of charge on an electrophotographic imaging member. Typical of these approaches is a power system comprising a high voltage power supply operated in some degree of constant current mode with a voltage limiting device connected between the corona screen terminals and ground. Other attempts to stabilize the operation of such systems have resulted in the introduction of auxiliary electrodes to sense a current that is proportional to the current to the ground plane and use this value to regulate the current to the ground plane. These systems have no way of predetermining what the ratio is between the sense current and the ground current. In addition, once this ratio is established for one set of operating conditions, there is no way to predict what the ratio will be for other operating conditions.

It is therefore the major objective of this invention to provide a control circuit for a corona discharge device in which the control parameters can be measured directly for control purposes.

It is another objective of this invention to provide a control circuit for a corona discharge device in which the control parameters can be accurately remotely controlled.

SUMMARY OF THE INVENTION

Briefly, according to the invention there is provided a control circuit for a corona generating device comprising a corona wire to which a corona generating potential is applied and a second electrode, which cooperates with the corona wire for controlling the corona emission, is coupled to the power source common through a resistor. A sense current and a reference current are summed and the high voltage to the corona wire is electronically controlled in response to the magnitude and polarity of the currents so the the sense current is maintained substantially constant.

DESCRIPTION OF THE PREFERRED EMBODIMENT

Figure 1:
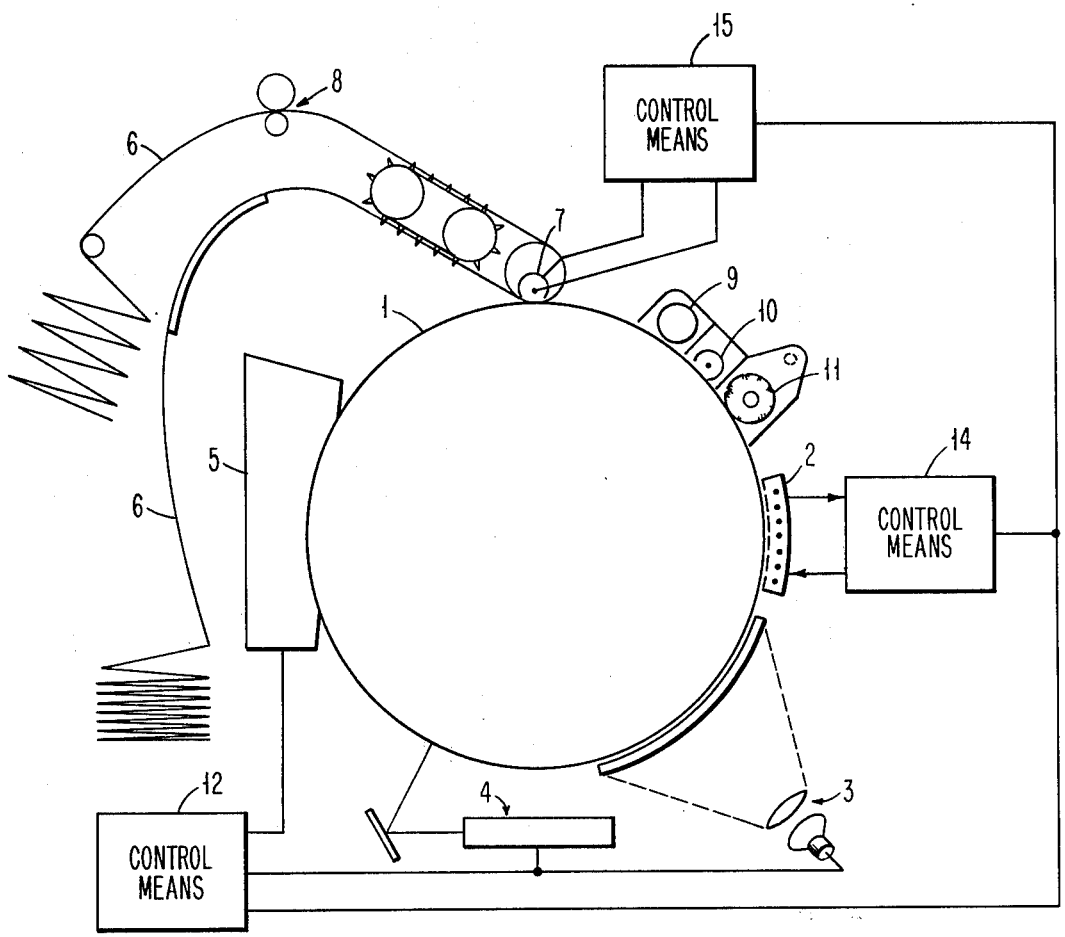
FIG. 1 is a schematic view of an electrophotographic apparatus embodying the present invention.

This invention is applicable in general to corona discharge devices utilized as ion generators for electrostatic charging to a uniform charge. However, the embodiment of the invention described relates to an electrophotographic apparatus since the requirements for a uniform charge may be particularly severe in this environment. In this electrophotographic apparatus shown in FIG. 1, a rotatable drum 1 carries around its periphery an electrophotographic photoconductive member upon which is directed an image which it is desired to be produced on continuous form web 6. The surface of the photoconductor is uniformly charged to a predetermined polarity by corona discharge device 2. The charged surface is exposed to a light image at the forms flash station 3 and/or exposure station 4 to produce a latent electrostatic image. The latent electrostatic image is developed by a suitable development unit 5 at which a toner carrier mixture is cascaded across the electrostatic image on the surface of the photoconductor as is known in the art. The toner has a charge such that it is attracted to the drum surface to render the image visible. The toned image is transferred to continuous form sheet 6 with the aid of transfer corona unit 7. The transfer corona unit sprays ions on the backside of sheet 6 of a polarity opposite that of the toner, thereby attracting the toner image from drum 1 to sheet 6. After the corona transfer the paper 6 is separated from the drum and fed past a fusing station 8 which serves to fuse and permanently fix the toner to the paper. Since transfer of all the image toner is not usually accomplished, residual toner usually remains on the drum surface after a transfer operation. At the cleaning station of the photoconductor is exposed successively to an erase lamp 9, a pre-clean corona 10 and a rotating cleaning brush 11. The erase lamp discharges the photoconductor and the pre-clean corona produces a charge so that the residual image toner is attracted electrostatically to the cleaning brush which sweeps the toner from the photoconductor surface. This operation completes the cycling of the drum for producing the desired image.

Control means 12 is provided to supply electrical control signals to coordinate the operation of all comnents of the system. In this manner, the position of the image on the drum can be coordinated so that the proper action takes place at the stations around the drum at the proper time. In addition, control means 12 may also provide temporary storage for image data supplied to exposure station 4 if desired.

According to the present invention, control means 14 is provided for electronically controlling the voltage to charge corona 2 to maintain a uniform charge on the surface of the photoconductor in the presence of varying environmental and system conditions. Control means 15 is provided for electronically controlling the voltage to the transfer corona 7 to maintain a uniform transfer charge on the back of continuous form web 6.

Generally, control means 14 and 15 provide electronic control of the high voltage to the corona wires according to some control factor. In addition to the corona wire there is provided a second electrode which cooperates with the corona wire for controlling the corona emission. A high voltage direct current source is provided and the high voltage is connected to the corona wire. The second electrode is coupled through a resistor to the common terminal of the power source to produce a selected current flow in the second electrode. A circuit is established which has a sense current flowing and this path includes a summing resistor in series in the path to a reference potential. A current source is provided to generate a reference current and this current is directed through the summing resistor. The algebraic sum of the currents through the summing resistor is used to adjust the high voltage from the direct current source in a direction to keep constant the sense current.

Figure 2:
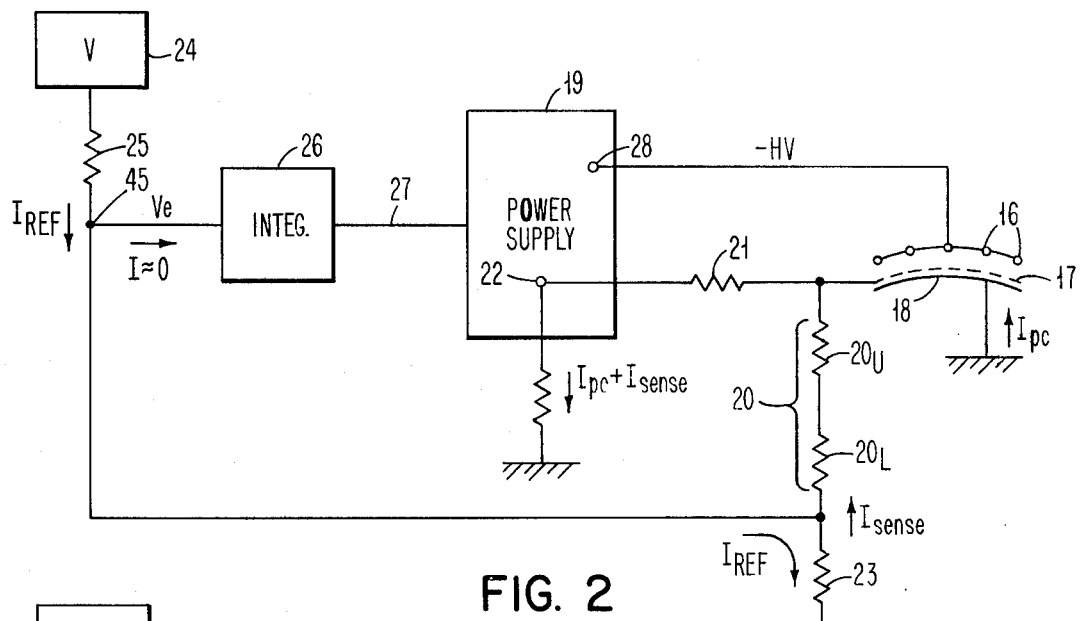
FIG. 2 is a simplified diagram of the control circuit utilized in the present invention to control the charge corona.

The function of the charge corona is to charge the photoconductor to a uniform charge prior to exposure. The primary objective of the charging system is to produce a constant photoconductor voltage minimizing the variation due to photoconductor wear, power line fluctuations, etc. Although any suitable corona generating device may be used, the corona device shown in FIG. 2 is the preferred embodiment for the invention. The charge corona shown in FIG. 2 comprises a plurality of corona wires 16 and a screen electrode 17 placed between the corona wires 16 and the photoconductor member 18 of drum 1. A suitable high voltage from power supply 19 is applied to the corona wires so that the surface of the photoconductor 18 is charged by corona discharge. The potential to which the photoconductor surface is charged can be varied by changing the potential to the screen electrode 17.

In the simplified diagram of the system shown in FIG. 2, it can be seen that the screen electrode 17 is terminated in two resistances, 20 and 21. Sense resistor 20 is a low power, precision divider to provide feedback $I_{sense}$ to the regulator and this resistor is split into two components $20_U$ and $20_L$ to provide an optional test point for metering. Resistor 21 is a higher power resisitor connected to the floating common terminal 22 of power supply 19. The voltage at terminal 22 is small compared to the voltage on screen electrode 17 $V_{SCRN}$ so that the screen current is $V_{SCRN}/Rp$ where Rp is the parallel equivalent of resistances 20 and 21.

A summing resistance 23 is provided between the end of resistance $20_L$ (i.e. summing junction 45) and ground reference potential. A reference current source is provided and in the embodiment shown in the drawings the reference current source comprises a reference voltage source 24 coupled through reference resistance 25 to produce the reference current $I_{ref}$. The intervening circuit connection to the junction between resistances $20_L$ and 23 produces a reference current $I_{ref}$ flow in that circuit. The reference current $I_{ref}$ is set so that when $I_{sense} = I_{ref}$, then the screen electrode voltage is equal to the desired value. The input to the integrator 26 is the error voltage, $V_e$, generated by a difference between the sense and reference currents. This difference is generated in summing resistor 23 since only these currents go through this resistance and the currents are in the opposite direction so that their algebraic sum is zero when the screen voltage is equal to the desired value. In this case the voltage on the feedback line 49 from resistor 23 to resistor 25 is zero. When the currents are unequal, the difference current produces a proportional voltage $V_e$ which is the error voltage. Depending upon the polarity of $V_e$, the output 27 of integrator 26 will increase or decrease, and this output is coupled to the control input of power supply 19 to produce the corresponding change to the high voltage at terminal 28 which is coupled to the corona wires. This corona voltage variation results in a change to the screen voltage and, therefore, to the sense current since a portion of the emission current flows to the screen electrode 17.

The overall operation of the regulator is such that the screen voltage can be controlled accurately and remotely by setting $I_{ref}$. In addition, constant screen current requires that the mission current vary directly with photoconductor current. As the photoconductor wears with use and requires more charging current, the emission current automatically increases. This control system produces a more constant photoconductor charge voltage than the type of control systems in which the emission current is held constant.

The objective of the transfer corona system is to have a constant current flowing to the photoconductor. Since the photoconductor backing is normally grounded and the second electrode accepts a portion of the emission current, it can be difficult to stabilize photoconductor current and, therefore, much more difficult to be able to vary it as changing conditions in the system may demand. The system shown in FIG. 3 relates to the transfer corona 7. The embodiment shown comprises a single corona wire 29 which is surrounded on about three sides with a second electrode 30. The system achieves the desired operation by electronically controlling the high voltage from power supply 31 to the corona so that the photoconductor current $I_{pc}$ is equal and opposite to the reference current $I_{ref}$. In the embodiment shown, the reference current is produced by the series circuit provided by reference voltage source 32, and reference resistance 33. A circuit path is provided to couple the reference current $I_{ref}$ to summing resistance 34. Summing resistance 34 is connected between ground reference potential through test resistor 35 to the floating common terminal 36 of power supply 31. The second electrode 30 of the transfer corona device is terminated with a resisitor 37 which is connected to the floating common terminal 36. This termination improves the stability of the corona device as well as giving a simple way to change the ratio of photoconductor to total emission currents. Since the secondary current $I_{sec}$ follows a path that does not go through ground potential, the photoconductor current $I_{pc}$ can be isolated and controlled as described. This system also provides the advantage in the ability to remotely control the photoconductor current by varying the reference voltage $V_{ref}$. The control in this case is similar to that already described since any difference in the currents $I_{pc}$ and $I_{ref}$ produces an error voltage, $V_e$, which is applied to the input of integrator 38. The output of the integrator is coupled to the input of power supply 31 to produce a change in the control to the power supply and, therefore, an adjustment of the high voltage at HV output terminal 39 to correct for the error condition.

Figure 4:
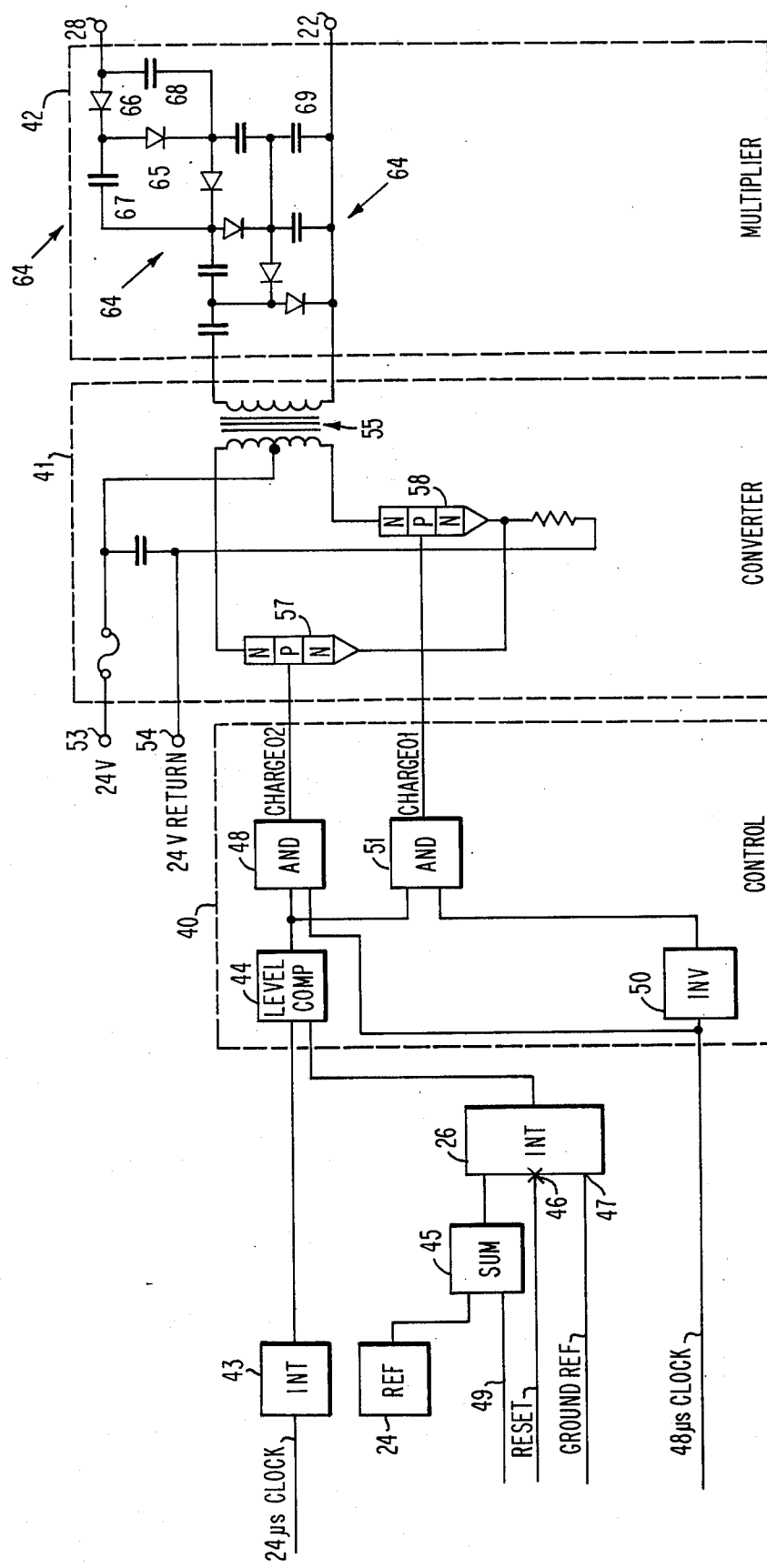
FIG. 4 is a schematic block diagram of an embodiment of the power supply control utilized in the present invention.

In the embodiment shown in FIG. 4, the power supply 19 comprises a control section 40, a converter section 41 and a voltage multiplier section 42. The control section receives a 24 microsecond clock signal and a 48 microsecond clock signal from control means 14. The 24 microsecond clock signals are passed through integrator 43 to produce a signal 24 μs Triangle. This signal is coupled to provide one input of level compare circuit 44. The output of reference voltage source 24 is coupled as one input to summing junction 45 and the other input is provided by the feedback from summing resistance 23. The output of summing junction 45 is coupled to provide one input to integrator 26. A second input at terminal 46 provides the ground potential reference and a third terminal 47 is to reset the integrator to a positive level. Prior to turning the system on, the integrator is reset to a positive level above the active zone (See FIG.

Figure 5:
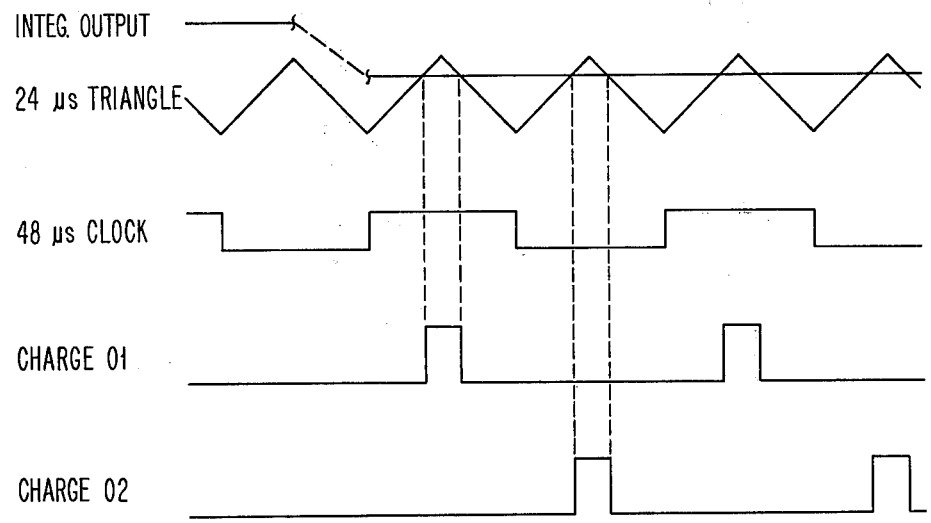
FIG. 5 is a set of waveforms for the signals used in the control circuits.

5) so that initially no power is applied to the corona. When the system is turned on, the integrator then provides the control to change the voltage gradually to the normal operating point. The output of integrator 26 provides the other input to level comparé circuit 44. The integrator output is compared to the 24 μs Triangle signal, the comparator 44 produces pulses of increasing duration as shown in the dotted lines in FIG. 5. The comparator output is combined with the 48 μs clock signal in AND circuit 48 to produce the output CHARGE 02 as shown in FIG. 5. The comparator output is combined with the signal −48μs clock (produced through inverter 50 from the 48μs clock input) in AND circuit 51 to produce output CHARGE 01 as shown in FIG. 5.

The foregoing control signals are coupled to control the converter section 41. In the embodiment shown, the converter section comprises a DC to DC converter. A DC voltage source is provided at terminals 53, 54 of a suitable level such as 24V. DC. The converter comprises a step-up transformer 55 having a center-tapped primary winding. The center tap coupled to the 24 volt terminal 53 and the ends of the primary winding of transformer 55 are coupled to the collectors of transistors 57, 58.

The signals CHARGE 01, 02 are coupled to turn on the associated transistor 57, 58, for the duration of the signals. As the CHARGE 01, 02, signals increase in pulse width, an increasing negative high voltage is produced at the corona wires. The output from the converter section 41 is taken across the secondary of transformer 55. Thus, it can be seen that the regulation is achieved without the use of high voltage active components since the control is achieved by adjusting the width of drive pulses to the power transistors.

The output from the converter section is coupled to the multiplier section 42 which in the embodiment shown comprises a plurality of cascaded voltage doubler circuits 64 arranged to produce a high voltage output at terminal 28. Each of the voltage doublers comprises two rectifiers 65, 66 and two capacitors 67, 68. An extra capacitor 69 has been added in parallel with the capacitor 68 of the first doubler stage 64 to improve the filtering. While the circuit shown in FIG. 4 has been described in connection with the charge corona control, all that is necessary to produce control for the transfer corona is to reverse the direction of the rectifiers 65, 66 in the high voltage section.

Figure 6:
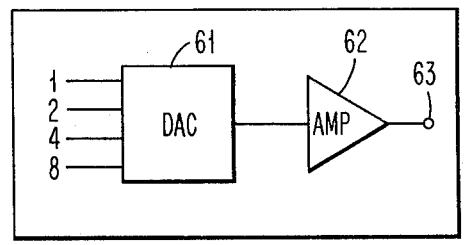
FIG. 6 is a schematic block diagram of an alternate embodiment of the invention suitable for remotely setting the value for one of the control factors used in the system.

The embodiment of the invention shown in FIG. 6 is suitable for remotely setting the value of one of the control factors to be used in the system. The apparatus comprises a digital to analog converter (DAC) 61 which has a number of digital input lines shown marked 1, 2, 4, 8 in the drawing. The DAC takes these digital inputs and converts them to an equivalent analog signal. The analog signal is coupled to amplifier 62 to produce a suitable voltage at output terminal 63.

The embodiment of the apparatus shown in FIG. 6 is usable with the apparatus shown in FIG. 2 by substituting the output of amplifier 62 at terminal 63 for the reference voltage source 24. Thus, by changing the digital input signals to DAC 61, the reference voltage for this circuit can be remotely changed. This may have utility, for example, as a contrast control for an electrophotographic system by having suitable switches on the operator panel for selection of contrast by the machine operator.

Figure 3:
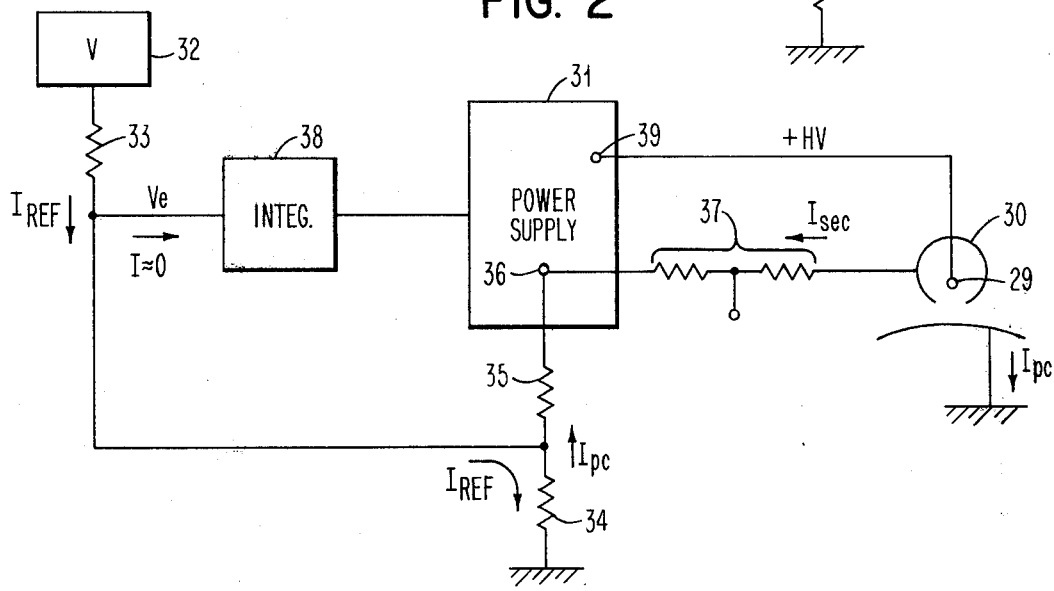
FIG. 3 is a simplified diagram of the control circuit utilized in the present invention to control the transfer corona.

The embodiment of the apparatus shown in FIG. 6 is also usable with the apparatus shown in FIG. 3 by substituting the output at amplifier terminal 63 in place of reference voltage source 32. This may have utility in connection with the transfer station in a machine that processes many different widths of paper. In this case, signals from which sensors sense the width position of the paper drive tractors to generate the digital signals and generate a signal voltage proportional to paper width. This controls the reference voltage and so, the transfer current. Since the unused width of the corona is blocked off by a shutter, this control provides a constant transfer current per unit width.

While the invention has been particularly shown and described with reference to preferred embodiments thereof, it will be understood by those skilled in the art that various changes in the form and details may be made therein without departing from the spirit and scope of the invention.

What is claimed is:

1. A control circuit for a corona discharge device utilized to produce a uniform charge on an electrophotographic imaging member comprising:
   a direct current power source having a high voltage terminal and a common terminal;
   a corona generating device having a plurality of corona emission wires and a screen member between said corona wires and said imaging member;
   means for connecting said high voltage terminal to said corona wire to produce corona emission;
   means for connecting a first resisitor between said screen electrode and said common terminal of said power source to produce a predetermined screen current;
   means for connecting said screen electrode to a summing point over a circuit path including a sense resistor to produce a sense current;
   a direct current power source for producing a reference current and circuit means to couple this reference current to said summing point;
   circuit means for connecting a summing resisitor from said summing point to a reference potential to produce an error voltage proportional to the difference between said sense current and said reference current; and
   means responsive to said error voltage to adjust the high voltage output inversely with the variation of the sense current.

2. The control circuit according to claim 1 additionally comprising means to vary said reference current in response to a remote signal.

3. The control circuit according to claim 2 wherein said means to vary said reference current in response to a remote signal comprises:
   means for supplying a remote digital signal corresponding to the desired reference;
   means for converting the digital signal to a current level proportional to said remote signal; and
   means for coupling the current level signal to produce the reference current in said control circuit.

4. The control circuit according to claim 1 wherein said direct current power source comprises control means, a converter section and a high voltage Section;
   said control means being operable in response to said error voltage to produce a set of drive pulses, the width of which is proportional to the error voltage, and
   means to couple the drive pulses to the converter section to control the output of said high voltage section in a direction so that increasing pulse width produces increasing high voltage output.

* * * * *